US012313508B2

(12) United States Patent
Zhou et al.

(10) Patent No.: US 12,313,508 B2
(45) Date of Patent: May 27, 2025

(54) PURIFICATION METHOD FOR DETECTION OF STRONTIUM ISOTOPE IN SILK CULTURAL RELIC

(71) Applicants: China National Silk Museum, Zhejiang (CN); Zhejiang Sci-Tech University, Zhejiang (CN)

(72) Inventors: Yang Zhou, Zhejiang (CN); Yong Liu, Zhejiang (CN); Zhiqin Peng, Zhejiang (CN); Bing Wang, Zhejiang (CN); Hailing Zheng, Zhejiang (CN); Hailiang Yang, Zhejiang (CN); Liling Jia, Zhejiang (CN); Hao Li, Zhejiang (CN); Dan Yang, Zhejiang (CN); Rui Jia, Zhejiang (CN)

(73) Assignees: China National Silk Museum, Zhejiang (CN); Zhejiang Sci-Tech University, Zhejiang (CN)

( * ) Notice: Subject to any disclaimer, the term of this patent is extended or adjusted under 35 U.S.C. 154(b) by 0 days.

(21) Appl. No.: 18/028,216

(22) PCT Filed: Jun. 30, 2022

(86) PCT No.: PCT/CN2022/102605
§ 371 (c)(1),
(2) Date: Mar. 24, 2023

(87) PCT Pub. No.: WO2023/245710
PCT Pub. Date: Dec. 28, 2023

(65) Prior Publication Data
US 2024/0302254 A1    Sep. 12, 2024

(30) Foreign Application Priority Data
Jun. 23, 2022  (CN) .......................... 202210719982.4

(51) Int. Cl.
*G01N 1/34*    (2006.01)
*G01N 1/40*    (2006.01)

(52) U.S. Cl.
CPC ............. *G01N 1/34* (2013.01); *G01N 1/4044* (2013.01)

(58) Field of Classification Search
CPC .......... G01N 1/34; G01N 1/4044; G01N 1/28; G01N 1/40; G01N 1/405; G01N 1/4077
See application file for complete search history.

(56) References Cited

U.S. PATENT DOCUMENTS 3,914,373 A    10/1975   Jepson

FOREIGN PATENT DOCUMENTS

| CN | 102344435 | 2/2012 |
| CN | 105301089 | 2/2016 |
| CN | 107436323 | 12/2017 |
| CN | 110646496 | 1/2020 |
| CN | 113433201 | 9/2021 |
| JP | 2013061183 | 4/2013 |

OTHER PUBLICATIONS

Espacenet English Translation of CN105301089. (Year: 2016).*
"International Search Report (Form PCT/ISA/210) of PCT/CN2022/102605," mailed on Dec. 29, 2022, pp. 1-5.

* cited by examiner

*Primary Examiner* — Kathryn Elizabeth Limbaugh
(74) *Attorney, Agent, or Firm* — JCIPRNET

(57) ABSTRACT

A purification method for detection of a strontium isotope in a silk cultural relic. The method includes: (1) enrichment of the strontium isotope: after cleaning the silk cultural relic, adding the silk cultural relic to a digestion agent for microwave digestion, and conducting evaporation drying; and adding a dried product to a nitric acid solution for centrifugal separation, and extracting a supernatant; and (2) purification of the strontium isotope: first, mixing 4',4"(5")-di-tert-butyl-dicyclohexano-18-crown-6 and a defoamer and adsorbed to a purified resin separation column, and pre-cleaning the purified resin separation column with a nitric acid solution; next, injecting the supernatant in step (1) into the purified resin separation column with a nitric acid solution as a carrier solution; and then, injecting an $^{84}$Sr solution and an elution solution into the purified resin separation column in sequence to obtain a separated and purified strontium solution.

10 Claims, No Drawings

PURIFICATION METHOD FOR DETECTION OF STRONTIUM ISOTOPE IN SILK CULTURAL RELIC

CROSS-REFERENCE TO RELATED APPLICATION

This application is a 371 of international application of PCT application serial no. PCT/CN2022/102605, filed on Jun. 30, 2022, which claims the priority benefit of China application no. 202210719982.4, filed on Jun. 23, 2022. The entirety of each of the above-mentioned patent applications is hereby incorporated by reference herein and made a part of this specification.

TECHNICAL FIELD

The present disclosure relates to the technical field of detection of cultural relics, and in particular to a purification method for detection of a strontium isotope in a silk cultural relic.

RELATED ART

Silk could be the first global commodity in history, and the origin of silk cultural relic has always been the direction of research to which historians and archaeologists have been devoted for over a hundred years. Researches of patterns, designs, weaving technologies and the like of the silk cultural relics were used as important methods for determining the origin of the silk. However, due to blending and integration of civilizations, these methods cannot be used for providing conclusive evidence of the origin of the silk.

At present, a more accurate method system is to trace the origin of the silk cultural relics by means of a strontium isotope, which is also the development direction of scientific tracing of textile cultural relics by an isotope technology. However, the content of the strontium isotope in the silk is extremely low (<5 ppm), and the sample amount of the silk cultural relics required to obtain an enough content of strontium for testing is large. In fact, due to the limited sample amount of the silk cultural relics and possible loss in a treatment process, accurate determination of the strontium isotope in the silk cultural relics is difficult to achieve. Therefore, targeted purification before the detection of the element strontium in the silk cultural relics is extremely necessary.

A Chinese invention patent CN113433201A discloses a sequential extraction method of a strontium isotope in a silk fabric cultural relic. The sequential extraction method involving water, acetic acid, hydrochloric acid, and nitric acid with hydrofluoric acid is used for a silk fabric sample, so as to explore the distribution rule of the strontium isotope in each phase state in the silk fabric sample. The method has the disadvantages that the influence of other impurity interfering ions cannot be avoided, and due to a lot of loss in an extraction process of the strontium isotope, the extraction rate of strontium in the silk cultural relic is low.

SUMMARY OF INVENTION

In order to solve the problem of targeted purification before detection of the element strontium in a silk cultural relic, the present disclosure provides a purification method for detection of a strontium isotope in a silk cultural relic. A microwave digestion method and a solid phase extraction method are used for enrichment and purification of the element strontium contained in silk to reduce loss of the element strontium, and meanwhile, the interference of other impurity ions can be eliminated, so as to achieve an optimal purification effect.

Specific technical solutions of the present disclosure are as follows. The present disclosure provides a purification method for detection of a strontium isotope in a silk cultural relic. The method includes the following steps:
(1) enrichment of the strontium isotope: after cleaning the silk cultural relic, adding the silk cultural relic to a digestion agent for microwave digestion, and conducting evaporation drying; and adding a dried product to a nitric acid solution for centrifugal separation, and extracting a supernatant; and
(2) purification of the strontium isotope: first, mixing 4',4"(5")-di-tert-butyldicyclohexano-18-crown-6 and a defoamer and adsorbed to a purified resin separation column, and pre-cleaning the purified resin separation column with a nitric acid solution, the defoamer being tributyl phosphate or n-octanol; next, injecting the supernatant in step (1) into the purified resin separation column with a nitric acid solution as a carrier solution; and then, injecting an $^{84}$Sr solution and an elution solution into the purified resin separation column in sequence to obtain a separated and purified strontium solution.

In the present disclosure, the strontium contained in the silk cultural relic is enriched by the microwave digestion method first, so that the time for enriching the strontium in silk can be shortened by using the microwave digestion method. In addition, a sample is digested in a closed digestion tank, so that the loss of volatile elements can be reduced, and more accurate analysis results are obtained. Since the content of the strontium in the silk is low (<5 ppm), and bubbles are likely to be generated when a strontium-containing mixed solution flows through the separation column in a testing process, the retention of the strontium in the purified resin separation column is reduced. Therefore, the tributyl phosphate or n-octanol is used as the defoamer for reducing the loss of the strontium. In addition, both the tributyl phosphate and the n-octanol can form an organic ligand with the 4',4"(5")-di-tert-butyldicyclohexano-18-crown-6 to form a certain coordination bond, so as to increase the retention rate of the strontium. However, the tributyl phosphate is a more preferred defoamer, because the tributyl phosphate has more bond positions for bonding to Sr, and the extraction rate of the strontium is higher. The organic ligand formed by the separation column is not affected by the pH of the solution in a separation process, and has high stability, which is beneficial to increase the extraction rate of the strontium in the silk.

Then, the $^{84}$Sr solution is used as an r-Sr natural analogue for stabilizing the purified resin separation column, so as to avoid operation hazards. Finally, the elution solution is used for rinsing and separation to obtain the strontium solution. The nitric acid solution is used in enrichment and purification processes, so that the introduction of other impurities can be avoided. Moreover, when the nitric acid solution is used as a carrier solution, the strontium has higher separation coefficients with other ions, and a better separation effect is achieved. According to the present disclosure, possible impurity ions contained in the silk are removed mainly based on the information of the strontium isotope in the silk, so as to purify the element strontium contained in the silk. Since the amount of the element strontium contained in the silk is extremely low, each step in the present disclosure has a positive effect on the enrichment and purification of the element strontium in the silk. In particular, the concentration, volume, and flow rate of the solvent used in each step are determined to achieve an optimal purification effect.

Preferably, in step (1), the silk cultural relic is cleaned with an ethanol aqueous solution; a volume ratio of ethanol to water in the ethanol aqueous solution is (1-2):1; and the digestion agent includes an $^{84}$Sr dilution agent, perchloric acid, and hydrofluoric acid.

Preferably, in step (1), a mass-volume ratio of the silk cultural relic to the $^{84}$Sr dilution agent to the perchloric acid to the hydrofluoric acid during the microwave digestion is (1-2 g):(0.05-0.1 g):(10-15 mL):(1-3 mL).

According to the present disclosure, the element strontium contained in the silk is enriched by the microwave digestion method in combination with an isotope dilution method, so that the time for enriching the element strontium contained in the silk cultural relic is shortened, and the energy consumption is low; and the results are also more accurate, and the difficulty in analysis of the strontium isotope in a complex sample such as the silk cultural relic is reduced. Furthermore, the environment will not be polluted by an acid reagent used in a closed space, so that good environmental friendliness is achieved.

Preferably, in step (1), the nitric acid solution has a concentration of 1-2 mol/L; and the centrifugal separation is conducted at a rate of 3,500-4,500 r/min for 10-30 min, and centrifugation is repeated 3-5 times.

Preferably, in step (2), the nitric acid solution for pre-cleaning has a concentration of 0.01-0.02 mol/L and a flow rate of 0.5-1.0 mL/min; and the nitric acid solution as a carrier solution has a concentration of 7-10 mol/L, preferably 8 mol/L, and a flow rate of 0.1-0.5 mL/min.

In a separation process, the nitric acid is used as a carrier solution, and the flow rate is strictly controlled to avoid bubbles generated in the purified resin separation column. When the nitric acid solution has a concentration of 7-10 mol/L, interfering ions such as $K^+$, $Ca^{2+}$, and $Mg^{2+}$ in the silk can be effectively separated, and it can be ensured that the Sr is retained in the purified resin separation column.

Preferably, in step (2), a mass ratio of the 4',4"(5")-di-tert-butyldicyclohexano-18-crown-6 to the defoamer is (1-2):1; and a 50-100 μm Amberchrom CG-71md resin, an 80-160 μm Amberchrom CG-71cd resin, or a 100-125 μm Amberlite@ XAD-7 resin is used as the purified resin separation column.

With the mass ratio of the 4',4"(5")-di-tert-butyldicyclohexano-18-crown-6 to the defoamer, the saturation of the 4',4"(5")-di-tert-butyldicyclohexano-18-crown-6 in the defoamer can be ensured, so that the strontium in the separation and purification system has a maximum retention rate. When the content of the 4',4"(5")-di-tert-butyldicyclohexano-18-crown-6 is too low, the retention rate of the strontium is reduced. When the content of the 4',4"(5")-di-tert-butyldicyclohexano-18-crown-6 is too high, the concentration is too high, a dense network structure is formed, which is not conducive to the separation of the strontium and other ions.

Preferably, in step (2), the $^{84}$Sr solution has a volume of 4-6 mL and a flow rate of 0.2-0.5 mL/min when being injected into the purified resin separation column.

In order to ensure thorough separation of the strontium and other ions, after a sample solution is sent to the purified resin separation column for separation, the $^{84}$Sr solution is used as a buffer, so that the possible residual sample solution can be completely rinsed. In addition, the $^{84}$Sr solution has an effect of stabilizing the purified resin separation column, so that the shortening of the service life of the purified resin separation column due to corrosion of the acid solution to the purified resin separation column is reduced.

Preferably, in step (2), the elution solution includes a $Na_2EDTA$ solution and a hydrochloric acid solution, and is injected into the purified resin separation column at a flow rate of 0.1-0.5 mL/min.

The $Na_2EDTA$ solution and the hydrochloric acid solution are used as the elution solution. The $Na_2EDTA$ will form a complex with the element strontium, so that the element Sr retained in the separation column can be effectively removed. The hydrochloric acid solution is used as a main rinsing solution, and the situation that the reuse of the purified resin separation column is affected by a complex formed by the tributyl phosphate contained in the purified resin separation column and the $Na_2EDTA$ can be avoided. However, when the concentration of the hydrochloric acid solution is too high, the structure of the separation column may be damaged, and the separation of the strontium and the most similar competing ions is not facilitated. When the concentration of the hydrochloric acid solution is too low, the separation efficiency is low, and the separation of the strontium and the competing ions is difficult.

Preferably, in step (2), a volume ratio of the $Na_2EDTA$ solution to the hydrochloric acid solution is 1:(10-15); the $Na_2EDTA$ solution has a concentration of 0.02-0.05 mol/L; and the hydrochloric acid solution has a concentration of 1-2 mol/L.

Preferably, in step (2), the separated and purified strontium solution is analyzed by mass spectrometry to obtain an $^{87}Sr/^{86}Sr$ ratio.

The purified strontium solution is measured by thermal ionization mass spectrometry (TIMS) to obtain a strontium isotope ratio. The interference of other impurity ions can be eliminated, and accurate isotope information of a silk sample is obtained.

Compared with the prior art, the present disclosure has the following beneficial effects.

(1) The element strontium contained in the silk is enriched by the microwave digestion method in combination with the isotope dilution method, so that the time for enriching the element strontium contained in the silk cultural relic is shortened, and the energy consumption is low; and the results are also more accurate, and the difficulty in analysis of the strontium isotope in a complex sample such as the silk cultural relic is reduced.

(2) The element strontium is separated and purified by the solid phase extraction method, and the tributyl phosphate is used as the defoamer to reduce the loss of the strontium. In addition, the tributyl phosphate can form an organic ligand with the 4',4"(5")-di-tert-butyldicyclohexano-18-crown-6 to form a certain coordination bond, so as to increase the retention rate of the strontium.

(3) The $Na_2EDTA$ solution and the hydrochloric acid solution are used as the elution solution, so that the element Sr retained in the purified resin separation column can be effectively removed.

(4) Since the amount of the element strontium contained in the silk is extremely low, the interference of other impurity ions can be eliminated by the present disclosure, and the element strontium in the silk is effectively enriched and purified. In particular, all the concentration, volume, and flow rate of the solvent used in each step have a positive effect, so as to achieve an optimal purification effect.

DESCRIPTION OF EMBODIMENTS

The present disclosure is further described below in conjunction with embodiments.

Total Embodiment

A purification method for detection of a strontium isotope in a silk cultural relic includes the following steps:
(1) enrichment of the strontium isotope in which the silk cultural relic is cleaned with an ethanol aqueous solution (a volume ratio of ethanol to water is (1-2):1), then the silk cultural relic is then placed into a TFL digestion tank, and an $^{84}$Sr dilution agent, perchloric acid, and hydrofluoric acid are added, a mass-volume ratio of the silk cultural relic to the $^{84}$Sr dilution agent to the perchloric acid to the hydrofluoric acid being (1-2 g):(0.05-0.1 g):(10-15 mL):(1-3 mL); digestion is conducted with a microwave digestion apparatus, a mixture is transferred to a clean culture dish, and evaporation is conducted until the mixture is nearly dry; a dried product is added to a nitric acid solution with a concentration of 1-2 mol/L for centrifugal separation at a rate of 3,500-4,500 r/min for 10-30 min, and a supernatant is extracted; and the step is repeated 3-5 times, and a supernatant obtained in the last centrifugation is extracted for later use;
(2) purification of the strontium isotope in which first, 4',4"(5")-di-tert-butyldicyclohexano-18-crown-6 (CAS number: 28801-57-2) and a defoamer (tributyl phosphate or n-octanol) are mixed at a mass ratio of (1-2):1 and adsorbed to a purified resin separation column (a 50-100 μm Amberchrom CG-71md resin, an 80-160 μm Amberchrom CG-71cd resin, or a 100-125 μm Amberlite@ XAD-7 resin is used) by a solid phase extraction method, and the purified resin separation column is pre-cleaned with a nitric acid solution with a concentration of 0.01-0.02 mol/L at a flow rate of 0.5-1.0 mL/min; next, the supernatant in step (1) is injected into the purified resin separation column with a nitric acid solution with a concentration of 7-10 mol/L as a carrier solution at a flow rate of 0.1-0.5 mL/min; then, 4-6 mL of an $^{84}$Sr solution is injected into the purified resin separation column at a flow rate of 0.2-0.5 mL/min, and 7-10 mL of an elution solution is injected into the purified resin separation column at a flow rate of 0.1-0.5 mL/min, where the elution solution is obtained by mixing a Na$_2$EDTA solution with a concentration of 0.02-0.05 mol/L and a hydrochloric acid solution with a concentration of 1-2 mol/L at a volume ratio of 1:(10-15); and finally, a separated and purified strontium solution is obtained;
(3) analysis of the strontium isotope in which the separated and purified strontium solution is analyzed by thermal ionization mass spectrometry (TIMS) to obtain an $^{87}$Sr/$^{86}$Sr ratio.

Embodiment 1

A purification method for detection of a strontium isotope in a silk cultural relic includes the following steps:
(1) enrichment of the strontium isotope in which 1 g of the silk cultural relic is cleaned with an ethanol aqueous solution (a volume ratio of ethanol to water is 1:1), then the silk cultural relic is placed into a TFL digestion tank, and 0.05 g of an $^{84}$Sr dilution agent, 10 mL of concentrated perchloric acid, and 2 mL of concentrated hydrofluoric acid are added; digestion is conducted with a microwave digestion apparatus, a mixture is transferred to a clean culture dish, and evaporation is conducted until the mixture is nearly dry; a dried product is added to a nitric acid solution with a concentration of 1 mol/L for centrifugal separation at a rate of 4,000 r/min for 20 min, and a supernatant is extracted; and the step is repeated 3 times, and a supernatant obtained in the last centrifugation is extracted for later use;
(2) purification of the strontium isotope in which first, 4',4"(5")-di-tert-butyldicyclohexano-18-crown-6 and tributyl phosphate are mixed at a mass ratio of 1:1 and adsorbed to a purified resin separation column (a 100 μm Amberchrom CG-71md resin is used) by a solid phase extraction method, a 2 mL polypropylene tube with an inner diameter of 1 cm and a height of 3.5 cm is used as an extraction chromatographic column in which 0.35 g of the resin is contained, and the purified resin separation column is pre-cleaned with 10 mL of a 0.01 mol/L nitric acid solution at a flow rate of 0.5 mL/min; next, the supernatant in step (1) is injected into the purified resin separation column with 10 mL of an 8 mol/L nitric acid solution as a carrier solution at a flow rate of 0.1 mL/min; then, 4 mL of an $^{84}$Sr solution is injected into the purified resin separation column at a flow rate of 0.2 mL/min, and 8 mL of an elution solution is injected into the purified resin separation column at a flow rate of 0.1 mL/min, where the elution solution is obtained by mixing a Na$_2$EDTA solution with a concentration of 0.05 mol/L and a hydrochloric acid solution with a concentration of 2 mol/L at a volume ratio of 1:10; and finally, a separated and purified strontium solution is obtained;
(3) analysis of the strontium isotope in which the separated and purified strontium solution is analyzed by thermal ionization mass spectrometry (TIMS) to obtain an $^{87}$Sr/$^{86}$Sr ratio.

Embodiment 2

A purification method for detection of a strontium isotope in a silk cultural relic includes the following steps:
(1) enrichment of the strontium isotope in which 1 g of the silk cultural relic is cleaned with an ethanol aqueous solution (a volume ratio of ethanol to water is 1:1), then the silk cultural relic is placed into a TFL digestion tank, and 0.07 g of an $^{84}$Sr dilution agent, 10 mL of concentrated perchloric acid, and 2 mL of concentrated hydrofluoric acid are added; digestion is conducted with a microwave digestion apparatus, a mixture is transferred to a clean culture dish, and evaporation is conducted until the mixture is nearly dry; a dried product is added to a nitric acid solution with a concentration of 1 mol/L for centrifugal separation at a rate of 3,500 r/min for 25 min, and a supernatant is extracted; and the step is repeated 4 times, and a supernatant obtained in the last centrifugation is extracted for later use;
(2) purification of the strontium isotope in which first, 4',4"(5")-di-tert-butyldicyclohexano-18-crown-6 and tributyl phosphate are mixed at a mass ratio of 1:1 and adsorbed to a purified resin separation column (a 100 μm Amberchrom CG-71md resin is used) by a solid phase extraction method, a 2 mL polypropylene tube with an inner diameter of 1 cm and a height of 3.5 cm is used as an extraction chromatographic column in which 0.35 g of the resin is contained, and the purified resin separation column is pre-cleaned with 15 mL of a 0.015 mol/L nitric acid solution at a flow rate of 0.5 mL/min; next, the supernatant in step (1) is injected into the purified resin separation column with 15 mL of an 8 mol/L nitric acid solution as a carrier solution at a flow rate of 0.3 mL/min; then, 5 mL of an $^{84}$Sr solution is injected into the purified resin separation column at a flow rate of 0.3 mL/min, and 8 mL of an elution solution is injected into the purified resin separation column at a flow rate of 0.3 mL/min, where the elution solution is obtained by mixing a Na$_2$EDTA solution with a concentration of 0.05 mol/L and a hydrochloric acid solution with a concentration of 2 mol/L at a volume ratio of 1:10; and finally, a separated and purified strontium solution is obtained;

(3) analysis of the strontium isotope in which the separated and purified strontium solution is analyzed by thermal ionization mass spectrometry (TIMS) to obtain an $^{87}$Sr/$^{86}$Sr ratio.

Embodiment 3

A purification method for detection of a strontium isotope in a silk cultural relic includes the following steps:
(1) enrichment of the strontium isotope in which 1 g of the silk cultural relic is cleaned with an ethanol aqueous solution (a volume ratio of ethanol to water is 1:1), then the silk cultural relic is placed into a TFL digestion tank, and 0.1 g of an $^{84}$Sr dilution agent, 15 mL of concentrated perchloric acid, and 2 mL of concentrated hydrofluoric acid are added; digestion is conducted with a microwave digestion apparatus, a mixture is transferred to a clean culture dish, and evaporation is conducted until the mixture is nearly dry; a dried product is added to a nitric acid solution with a concentration of 1 mol/L for centrifugal separation at a rate of 4,000 r/min for 15 min, and a supernatant is extracted; and the step is repeated 5 times, and a supernatant obtained in the last centrifugation is extracted for later use;
(2) purification of the strontium isotope in which first, 4',4"(5")-di-tert-butyldicyclohexano-18-crown-6 and tributyl phosphate are mixed at a mass ratio of 1:1 and adsorbed to a purified resin separation column (a 100 μm Amberchrom CG-71md resin is used) by a solid phase extraction method, a 2 mL polypropylene tube with an inner diameter of 1 cm and a height of 3.5 cm is used as an extraction chromatographic column in which 0.35 g of the resin is contained, and the purified resin separation column is pre-cleaned with 20 mL of a 0.02 mol/L nitric acid solution at a flow rate of 1.0 mL/min; next, the supernatant in step (1) is injected into the purified resin separation column with 20 mL of an 8 mol/L nitric acid solution as a carrier solution at a flow rate of 0.5 mL/min; then, 6 mL of an $^{84}$Sr solution is injected into the purified resin separation column at a flow rate of 0.5 mL/min, and 8 mL of an elution solution is injected into the purified resin separation column at a flow rate of 0.1 mL/min, where the elution solution is obtained by mixing a Na$_2$EDTA solution with a concentration of 0.05 mol/L and a hydrochloric acid solution with a concentration of 2 mol/L at a volume ratio of 1:10; and finally, a separated and purified strontium solution is obtained;

(3) analysis of the strontium isotope in which the separated and purified strontium solution is analyzed by thermal ionization mass spectrometry (TIMS) to obtain an $^{87}$Sr/$^{86}$Sr ratio.

Embodiment 4

Different from Embodiment 1 is that: 4',4"(5")-di-tert-butyldicyclohexano-18-crown-6 and n-octanol are adsorbed to a purified resin separation column.

A purification method for detection of a strontium isotope in a silk cultural relic includes the following steps:
(1) enrichment of the strontium isotope in which 1 g of the silk cultural relic is cleaned with an ethanol aqueous solution (a volume ratio of ethanol to water is 1:1), then the silk cultural relic is placed into a TFL digestion tank, and 0.05 g of an $^{84}$Sr dilution agent, 10 mL of concentrated perchloric acid, and 2 mL of concentrated hydrofluoric acid are added; digestion is conducted with a microwave digestion apparatus, a mixture is transferred to a clean culture dish, and evaporation is conducted until the mixture is nearly dry; a dried product is added to a nitric acid solution with a concentration of 1 mol/L for centrifugal separation at a rate of 4,000 r/min for 20 min, and a supernatant is extracted; and the step is repeated 3 times, and a supernatant obtained in the last centrifugation is extracted for later use;
(2) purification of the strontium isotope in which first, 4',4"(5")-di-tert-butyldicyclohexano-18-crown-6 and n-octanol are mixed at a mass ratio of 1:1 and adsorbed to a purified resin separation column (a 100 μm Eichrom Sr resin is used) by a solid phase extraction method, a 2 mL polypropylene tube with an inner diameter of 1 cm and a height of 3.5 cm is used as an extraction chromatographic column in which 0.35 g of the resin is contained, and the purified resin separation column is pre-cleaned with 10 mL of a 0.01 mol/L nitric acid solution at a flow rate of 0.5 mL/min; next, the supernatant in step (1) is injected into the purified resin separation column with 10 mL of an 8 mol/L nitric acid solution as a carrier solution at a flow rate of 0.1 mL/min; then, 4 mL of an $^{84}$Sr solution is injected into the purified resin separation column at a flow rate of 0.2 mL/min, and 8 mL of an elution solution is injected into the purified resin separation column at a flow rate of 0.1 mL/min, where the elution solution is obtained by mixing a Na$_2$EDTA solution with a concentration of 0.05 mol/L and a hydrochloric acid solution with a concentration of 2 mol/L at a volume ratio of 1:10; and finally, a separated and purified strontium solution is obtained;

(3) analysis of the strontium isotope in which the separated and purified strontium solution is analyzed by thermal ionization mass spectrometry (TIMS) to obtain an $^{87}$Sr/$^{86}$Sr ratio.

Comparative Example 1

Different from Embodiment 1 is that: only the same total mass of 4',4"(5")-di-tert-butyldicyclohexano-18-crown-6 is adsorbed to a purified resin separation column.

A purification method for detection of a strontium isotope in a silk cultural relic includes the following steps:
(1) enrichment of the strontium isotope in which 1 g of the silk cultural relic is cleaned with an ethanol aqueous solution (a volume ratio of ethanol to water is 1:1), then the silk cultural relic is placed into a TFL digestion tank, and 0.05 g of an $^{84}$Sr dilution agent, 10 mL of concentrated perchloric acid, and 2 mL of concentrated hydrofluoric acid are added; digestion is conducted with a microwave digestion apparatus, a mixture is transferred to a clean culture dish, and evaporation is conducted until the mixture is nearly dry; a dried product is added to a nitric acid solution with a concentration of 1 mol/L for centrifugal separation at a rate of 4,000 r/min for 20 min, and a supernatant is extracted; and the step is repeated 3 times, and a supernatant obtained in the last centrifugation is extracted for later use;

(2) purification of the strontium isotope in which first, 4',4"(5")-di-tert-butyldicyclohexano-18-crown-6 is adsorbed to a purified resin separation column (a 100 μm Amberchrom CG-71md resin is used) by a solid phase extraction method, a 2 mL polypropylene tube with an inner diameter of 1 cm and a height of 3.5 cm is used as an extraction chromatographic column in which 0.35 g of the resin is contained, and the purified resin separation column is pre-cleaned with 10 mL of a 0.01 mol/L nitric acid solution at a flow rate of 0.5 mL/min; next, the supernatant in step (1) is injected into the purified resin separation column with 10 mL of an 8 mol/L nitric acid solution as a carrier solution at a flow rate of 0.1 mL/min; then, 4 mL of an $^{84}$Sr solution is injected into the purified resin separation column at a flow rate of 0.2 mL/min, and 8 mL of an elution solution is injected into the purified resin separation column at a flow rate of 0.1 mL/min, where the elution solution is obtained by mixing a Na$_2$EDTA solution with a concentration of 0.05 mol/L and a hydrochloric acid solution with a concentration of 2 mol/L at a volume ratio of 1:10; and finally, a separated and purified strontium solution is obtained;

(3) analysis of the strontium isotope in which the separated and purified strontium solution is analyzed by thermal ionization mass spectrometry (TIMS) to obtain an $^{87}$Sr/$^{86}$Sr ratio.

Comparative Example 2

Different from Embodiment 1 is that: only the same total mass of tributyl phosphate is adsorbed to a purified resin separation column.

A purification method for detection of a strontium isotope in a silk cultural relic includes the following steps:

(1) enrichment of the strontium isotope in which 1 g of the silk cultural relic is cleaned with an ethanol aqueous solution (a volume ratio of ethanol to water is 1:1), then the silk cultural relic is placed into a TFL digestion tank, and 0.05 g of an $^{84}$Sr dilution agent, 10 mL of concentrated perchloric acid, and 2 mL of concentrated hydrofluoric acid are added; digestion is conducted with a microwave digestion apparatus, a mixture is transferred to a clean culture dish, and evaporation is conducted until the mixture is nearly dry; a dried product is added to a nitric acid solution with a concentration of 1 mol/L for centrifugal separation at a rate of 4,000 r/min for 20 min, and a supernatant is extracted; and the step is repeated 3 times, and a supernatant obtained in the last centrifugation is extracted for later use;

(2) purification of the strontium isotope in which first, tributyl phosphate is adsorbed to a purified resin separation column (a 100 μm Amberchrom CG-71md resin is used) by a solid phase extraction method, a 2 mL polypropylene tube with an inner diameter of 1 cm and a height of 3.5 cm is used as an extraction chromatographic column in which 0.35 g of the resin is contained, and the purified resin separation column is pre-cleaned with 10 mL of a 0.01 mol/L nitric acid solution at a flow rate of 0.5 mL/min; next, the supernatant in step (1) is injected into the purified resin separation column with 10 mL of an 8 mol/L nitric acid solution as a carrier solution at a flow rate of 0.1 mL/min; then, 4 mL of an $^{84}$Sr solution is injected into the purified resin separation column at a flow rate of 0.2 mL/min, and 8 mL of an elution solution is injected into the purified resin separation column at a flow rate of 0.1 mL/min, where the elution solution is obtained by mixing a Na$_2$EDTA solution with a concentration of 0.05 mol/L and a hydrochloric acid solution with a concentration of 2 mol/L at a volume ratio of 1:10; and finally, a separated and purified strontium solution is obtained;

(3) analysis of the strontium isotope in which the separated and purified strontium solution is analyzed by thermal ionization mass spectrometry (TIMS) to obtain an $^{87}$Sr/$^{86}$Sr ratio.

Comparative Example 3

Different from Embodiment 1 is that: the mass ratio of 4',4"(5")-di-tert-butyldicyclohexano-18-crown-6 to tributyl phosphate is 1:2.

A purification method for detection of a strontium isotope in a silk cultural relic includes the following steps:

(1) enrichment of the strontium isotope in which 1 g of the silk cultural relic is cleaned with an ethanol aqueous solution (a volume ratio of ethanol to water is 1:1), then the silk cultural relic is placed into a TFL digestion tank, and 0.05 g of an $^{84}$Sr dilution agent, 10 mL of concentrated perchloric acid, and 2 mL of concentrated hydrofluoric acid are added; digestion is conducted with a microwave digestion apparatus, a mixture is transferred to a clean culture dish, and evaporation is conducted until the mixture is nearly dry; a dried product is added to a nitric acid solution with a concentration of 1 mol/L for centrifugal separation at a rate of 4,000 r/min for 20 min, and a supernatant is extracted; and the step is repeated 3 times, and a supernatant obtained in the last centrifugation is extracted for later use;

(2) purification of the strontium isotope in which first, 4',4"(5")-di-tert-butyldicyclohexano-18-crown-6 and tributyl phosphate are mixed at a mass ratio of 1:2 and adsorbed to a purified resin separation column (a 100 μm Amberchrom CG-71md resin is used) by a solid phase extraction method, a 2 mL polypropylene tube with an inner diameter of 1 cm and a height of 3.5 cm is used as an extraction chromatographic column in which 0.35 g of the resin is contained, and the purified resin separation column is pre-cleaned with 10 mL of a 0.01 mol/L nitric acid solution at a flow rate of 0.5 mL/min; next, the supernatant in step (1) is injected into the purified resin separation column with 10 mL of an 8 mol/L nitric acid solution as a carrier solution at a flow rate of 0.1 mL/min; then, 4 mL of an $^{84}$Sr solution is injected into the purified resin separation column at a flow rate of 0.2 mL/min, and 8 mL of an elution solution is injected into the purified resin separation column at a flow rate of 0.1 mL/min, where the elution solution is obtained by mixing a Na$_2$EDTA solution with a concentration of 0.05 mol/L and a hydrochloric acid solution with a concentration of 2 mol/L at a volume ratio of 1:10; and finally, a separated and purified strontium solution is obtained;

(3) analysis of the strontium isotope in which the separated and purified strontium solution is analyzed by thermal ionization mass spectrometry (TIMS) to obtain an $^{87}$Sr/$^{86}$Sr ratio.

Comparative Example 4

Different from Embodiment 1 is that: the concentration of a nitric acid solution as a carrier solution is 2 mol/L.

A purification method for detection of a strontium isotope in a silk cultural relic includes the following steps:

(1) enrichment of the strontium isotope in which 1 g of the silk cultural relic is cleaned with an ethanol aqueous solution (a volume ratio of ethanol to water is 1:1), then the silk cultural relic is placed into a TFL digestion tank, and 0.05 g of an $^{84}$Sr dilution agent, 10 mL of concentrated perchloric acid, and 2 mL of concentrated hydrofluoric acid are added; digestion is conducted with a microwave digestion apparatus, a mixture is transferred to a clean culture dish, and evaporation is conducted until the mixture is nearly dry; a dried product is added to a nitric acid solution with a concentration of 1 mol/L for centrifugal separation at a rate of 4,000 r/min for 20 min, and a supernatant is extracted; and the step is repeated 3 times, and a supernatant obtained in the last centrifugation is extracted for later use;

(2) purification of the strontium isotope in which first, 4',4"(5")-di-tert-butyldicyclohexano-18-crown-6 and tributyl phosphate are mixed at a mass ratio of 1:1 and adsorbed to a purified resin separation column (a 100 μm Amberchrom CG-71md resin is used) by a solid phase extraction method, a 2 mL polypropylene tube with an inner diameter of 1 cm and a height of 3.5 cm is used as an extraction chromatographic column in which 0.35 g of the resin is contained, and the purified resin separation column is pre-cleaned with 10 mL of a 0.01 mol/L nitric acid solution at a flow rate of 0.5 mL/min; next, the supernatant in step (1) is injected into the purified resin separation column with 10 mL of a 2 mol/L nitric acid solution as a carrier solution at a flow rate of 0.1 mL/min; then, 4 mL of an $^{84}$Sr solution is injected into the purified resin separation column at a flow rate of 0.2 mL/min, and 8 mL of an elution solution is injected into the purified resin separation column at a flow rate of 0.1 mL/min, where the elution solution is obtained by mixing a Na$_2$EDTA solution with a concentration of 0.05 mol/L and a hydrochloric acid solution with a concentration of 2 mol/L at a volume ratio of 1:10; and finally, a separated and purified strontium solution is obtained;

(3) analysis of the strontium isotope in which the separated and purified strontium solution is analyzed by thermal ionization mass spectrometry (TIMS) to obtain an $^{87}$Sr/$^{86}$Sr ratio.

Comparative Example 5

Different from Embodiment 1 is that: the flow rate of a nitric acid solution as a carrier solution is 1.0 mL/min.

A purification method for detection of a strontium isotope in a silk cultural relic includes the following steps:

(1) enrichment of the strontium isotope in which 1 g of the silk cultural relic is cleaned with an ethanol aqueous solution (a volume ratio of ethanol to water is 1:1), then the silk cultural relic is placed into a TFL digestion tank, and 0.05 g of an $^{84}$Sr dilution agent, 10 mL of concentrated perchloric acid, and 2 mL of concentrated hydrofluoric acid are added; digestion is conducted with a microwave digestion apparatus, a mixture is transferred to a clean culture dish, and evaporation is conducted until the mixture is nearly dry; a dried product is added to a nitric acid solution with a concentration of 1 mol/L for centrifugal separation at a rate of 4,000 r/min for 20 min, and a supernatant is extracted; and the step is repeated 3 times, and a supernatant obtained in the last centrifugation is extracted for later use;

(2) purification of the strontium isotope in which first, 4',4"(5")-di-tert-butyldicyclohexano-18-crown-6 and tributyl phosphate are mixed at a mass ratio of 1:1 and adsorbed to a purified resin separation column (a 100 μm Amberchrom CG-71md resin is used) by a solid phase extraction method, a 2 mL polypropylene tube with an inner diameter of 1 cm and a height of 3.5 cm is used as an extraction chromatographic column in which 0.35 g of the resin is contained, and the purified resin separation column is pre-cleaned with 10 mL of a 0.01 mol/L nitric acid solution at a flow rate of 0.5 mL/min; next, the supernatant in step (1) is injected into the purified resin separation column with 10 mL of an 8 mol/L nitric acid solution as a carrier solution at a flow rate of 1.0 mL/min; then, 4 mL of an $^{84}$Sr solution is injected into the purified resin separation column at a flow rate of 0.2 mL/min, and 8 mL of an elution solution is injected into the purified resin separation column at a flow rate of 0.1 mL/min, where the elution solution is obtained by mixing a Na$_2$EDTA solution with a concentration of 0.05 mol/L and a hydrochloric acid solution with a concentration of 2 mol/L at a volume ratio of 1:10; and finally, a separated and purified strontium solution is obtained;

(3) analysis of the strontium isotope in which the separated and purified strontium solution is analyzed by thermal ionization mass spectrometry (TIMS) to obtain an $^{87}$Sr/$^{86}$Sr ratio.

Comparative Example 6

Different from Embodiment 1 is that: a Na$_2$EDTA solution is not included in an elution solution.

A purification method for detection of a strontium isotope in a silk cultural relic includes the following steps:

(1) enrichment of the strontium isotope in which 1 g of the silk cultural relic is cleaned with an ethanol aqueous solution (a volume ratio of ethanol to water is 1:1), then the silk cultural relic is placed into a TFL digestion tank, and 0.05 g of an $^{84}$Sr dilution agent, 10 mL of concentrated perchloric acid, and 2 mL of concentrated hydrofluoric acid are added; digestion is conducted with a microwave digestion apparatus, a mixture is transferred to a clean culture dish, and evaporation is conducted until the mixture is nearly dry; a dried product is added to a nitric acid solution with a concentration of 1 mol/L for centrifugal separation at a rate of 4,000 r/min for 20 min, and a supernatant is extracted; and the step is repeated 3 times, and a supernatant obtained in the last centrifugation is extracted for later use;

(2) purification of the strontium isotope in which first, 4',4"(5")-di-tert-butyldicyclohexano-18-crown-6 and tributyl phosphate are mixed at a mass ratio of 1:1 and adsorbed to a purified resin separation column (a 100 μm Amberchrom CG-71md resin is used) by a solid phase extraction method, a 2 mL polypropylene tube with an inner diameter of 1 cm and a height of 3.5 cm is used as an extraction chromatographic column in which 0.35 g of the resin is contained, and the purified resin separation column is pre-cleaned with 10 mL of a 0.01 mol/L nitric acid solution at a flow rate of 0.5 mL/min; next, the supernatant in step (1) is injected into the purified resin separation column with 10 mL of an 8 mol/L nitric acid solution as a carrier solution at a flow rate of 0.1 mL/min; then, 4 mL of an $^{84}$Sr solution is injected into the purified resin separation column at a flow rate of 0.2 mL/min, and 8 mL of an elution solution is injected into the purified resin separation column at a flow rate of 0.1 mL/min, where the elution solution is a hydrochloric acid solution with a concentration of 2 mol/L; and finally, a separated and purified strontium solution is obtained;

(3) analysis of the strontium isotope in which the separated and purified strontium solution is analyzed by thermal ionization mass spectrometry (TIMS) to obtain an $^{87}$Sr/$^{86}$Sr ratio.

Comparative Example 7

Different from Embodiment 1 is that: the concentration of a Na$_2$EDTA solution in an elution solution is 0.1 mol/L.

A purification method for detection of a strontium isotope in a silk cultural relic includes the following steps:

(1) enrichment of the strontium isotope in which 1 g of the silk cultural relic is cleaned with an ethanol aqueous solution (a volume ratio of ethanol to water is 1:1), then the silk cultural relic is placed into a TFL digestion tank, and 0.05 g of an $^{84}$Sr dilution agent, 10 mL of concentrated perchloric acid, and 2 mL of concentrated hydrofluoric acid are added; digestion is conducted with a microwave digestion apparatus, a mixture is transferred to a clean culture dish, and evaporation is conducted until the mixture is nearly dry; a dried product is added to a nitric acid solution with a concentration of 1 mol/L for centrifugal separation at a rate of 4,000 r/min for 20 min, and a supernatant is extracted; and the step is repeated 3 times, and a supernatant obtained in the last centrifugation is extracted for later use;

(2) purification of the strontium isotope in which first, 4',4"(5")-di-tert-butyldicyclohexano-18-crown-6 and tributyl phosphate are mixed at a mass ratio of 1:1 and adsorbed to a purified resin separation column (a 100 μm Amberchrom CG-71md resin is used) by a solid phase extraction method, a 2 mL polypropylene tube with an inner diameter of 1 cm and a height of 3.5 cm is used as an extraction chromatographic column in which 0.35 g of the resin is contained, and the purified resin separation column is pre-cleaned with 10 mL of a 0.01 mol/L nitric acid solution at a flow rate of 0.5 mL/min; next, the supernatant in step (1) is injected into the purified resin separation column with 10 mL of an 8 mol/L nitric acid solution as a carrier solution at a flow rate of 0.1 mL/min; then, 4 mL of an $^{84}$Sr solution is injected into the purified resin separation column at a flow rate of 0.2 mL/min, and 8 mL of an elution solution is injected into the purified resin separation column at a flow rate of 0.1 mL/min, where the elution solution is obtained by mixing a Na$_2$EDTA solution with a concentration of 0.1 mol/L and a hydrochloric acid solution with a concentration of 2 mol/L at a volume ratio of 1:10; and finally, a separated and purified strontium solution is obtained;

(3) analysis of the strontium isotope in which the separated and purified strontium solution is analyzed by thermal ionization mass spectrometry (TIMS) to obtain an $^{87}$Sr/$^{86}$Sr ratio.

TABLE 1

| Embodiment | Extraction rate of strontium | $^{87}$Sr/$^{86}$Sr ratio |
|---|---|---|
| Embodiment 1 | 98.2% ± 1% | 0.710728 |
| Embodiment 2 | 97% ± 1% | 0.710649 |
| Embodiment 3 | 96% ± 1% | 0.711686 |
| Embodiment 4 | 97% ± 1% | 0.709871 |
| Comparative Example 1 | 79 ± 1% | 0.710797 |
| Comparative Example 2 | 7 ± 1% | 0.710702 |
| Comparative Example 3 | 56 ± 1% | 0.710754 |
| Comparative Example 4 | 54 ± 1% | 0.710641 |
| Comparative Example 5 | 46 ± 1% | 0.710562 |
| Comparative Example 6 | 85 ± 1% | 0.710856 |
| Comparative Example 7 | 74 ± 1% | 0.710600 |

In Table 1, a calculation method of the extraction rate is as follows: extraction rate=$(A_B-A_S-A_W)/A_B*100\%$; and $A_B$, $A_S$, and $A_W$ refer to the concentration of an analyte when the supernatant is injected into the purified resin separation column in step (2), the concentration of a column effluent after the supernatant is injected into the purified resin separation column, and the concentration of a solution after the purified resin separation column is pre-cleaned, respectively.

As shown in Table 1, effective enrichment and purification of the element strontium in the silk can be achieved by the present disclosure, the interference of other impurity ions can be eliminated, and the loss of the element strontium is reduced. All the concentration, volume, and flow rate of the solvent used in each step of the purification method have a positive effect, so as to achieve an optimal purification effect. From Embodiment 4 and Embodiment 1, it can be seen that when the dilution agent is replaced with the n-octanol, the n-octanol forms low organic coordination with the 4',4"(5")-di-tert-butyldicyclohexano-18-crown-6, and the extraction rate of the strontium is reduced. From Comparative Examples 1-3, it can be seen that the adsorption of the 4',4"(5")-di-tert-butyldicyclohexano-18-crown-6 and the tributyl phosphate to the purified resin separation column is particularly important for effective purification of the element strontium, and changes of the composition and component ratio will affect the organic coordination with the element strontium and reduce the final extraction rate of the strontium. From Comparative Examples 4-5, it can be seen that the nitric acid is used as a carrier solution in the separation process. When the concentration of the nitric acid solution is too low, impurity interfering ions such as K$^+$, Ca$^{2+}$, and Mg$^{2+}$ cannot be effectively removed and separated. When the flow rate of the nitric acid solution is too high, bubbles are likely to be generated in the purified resin separation column, which is not conducive to achieving an optimal purification effect. From Comparative Examples 6-7, it can be seen that due to the $Na_2EDTA$ solution in the elution solution, effective separation of the element strontium in the separation column can be ensured, and the loss of the element strontium is reduced. However, when the concentration of the $Na_2EDTA$ solution is too high, it is not conducive to the purification effect of the element strontium.

Unless otherwise specified, all raw materials and apparatuses used in the present disclosure are commonly used raw materials and apparatuses in the field. Unless otherwise specified, all methods used in the present disclosure are conventional methods in the field.

Descriptions above are merely preferred embodiments of the present disclosure, and are not intended to limit the present disclosure in any manner. Any simple modifications, changes, and equivalent transformations of the above embodiments made according to the technical essence of the present disclosure still fall within the protection scope of the technical solutions of the present disclosure.

What is claimed is:

1. A purification method for detection of a strontium isotope in a silk cultural relic, characterized in that, comprising the following steps:
   (1) enrichment of the strontium isotope: after cleaning the silk cultural relic, adding the silk cultural relic to a digestion agent for microwave digestion, and conducting evaporation drying; and adding a dried product to a nitric acid solution for centrifugal separation, and extracting a supernatant; and
   (2) purification of the strontium isotope: first, mixing 4',4"(5")-di-tert-butyldicyclohexano-18-crown-6 and a defoamer and absorbing to a purified resin separation column, and pre-cleaning the purified resin separation column with a nitric acid solution, the defoamer being tributyl phosphate or n-octanol; next, injecting the supernatant in the step (1) into the purified resin separation column with a nitric acid solution as a carrier solution; and then, injecting an $^{84}Sr$ solution and an elution solution into the purified resin separation column in sequence to obtain a separated and purified strontium solution.

2. The purification method for detection of a strontium isotope in a silk cultural relic according to claim 1, wherein in the step (1), the silk cultural relic is cleaned with an ethanol aqueous solution; a volume ratio of ethanol to water in the ethanol aqueous solution is (1-2):1; and the digestion agent comprises an $^{84}Sr$ dilution agent, perchloric acid, and hydrofluoric acid.

3. The purification method for detection of a strontium isotope in a silk cultural relic according to claim 2, wherein in the step (1), a mass-volume ratio of the silk cultural relic to the $^{84}Sr$ dilution agent to the perchloric acid to the hydrofluoric acid during the microwave digestion is (1-2 g):(0.05-0.1 g):(10-15 mL):(1-3 mL).

4. The purification method for detection of a strontium isotope in a silk cultural relic according to claim 1, wherein in the step (1), the nitric acid solution has a concentration of 1-2 mol/L; and the centrifugal separation is conducted at a rate of 3,500-4,500 r/min for 10-30 min, and centrifugation is repeated 3-5 times.

5. The purification method for detection of a strontium isotope in a silk cultural relic according to claim 1, wherein in the step (2), the nitric acid solution for pre-cleaning has a concentration of 0.01-0.02 mol/L and a flow rate of 0.5-1.0 mL/min; and the nitric acid solution as a carrier solution has a concentration of 7-10 mol/L and a flow rate of 0.1-0.5 mL/min.

6. The purification method for detection of a strontium isotope in a silk cultural relic according to claim 1, wherein in the step (2), a mass ratio of the 4',4"(5")-di-tert-butyldicyclohexano-18-crown-6 to the defoamer is (1-2):1.

7. The purification method for detection of a strontium isotope in a silk cultural relic according to claim 1, wherein in the step (2), the $^{84}Sr$ solution has a volume of 4-6 mL and a flow rate of 0.2-0.5 mL/min when being injected into the purified resin separation column.

8. The purification method for detection of a strontium isotope in a silk cultural relic according to claim 1, wherein in the step (2), the elution solution comprises a $Na_2EDTA$ solution and a hydrochloric acid solution, and is injected into the purified resin separation column at a flow rate of 0.1-0.5 mL/min.

9. The purification method for detection of a strontium isotope in a silk cultural relic according to claim 8, wherein in the step (2), a volume ratio of the $Na_2EDTA$ solution to the hydrochloric acid solution is 1:(10-15); the $Na_2EDTA$ solution has a concentration of 0.02-0.05 mol/L; and the hydrochloric acid solution has a concentration of 1-2 mol/L.

10. The purification method for detection of a strontium isotope in a silk cultural relic according to claim 1, wherein in the step (2), the separated and purified strontium solution is analyzed by mass spectrometry to obtain an $^{87}Sr/^{86}Sr$ ratio.

* * * * *